US011946408B2

(12) United States Patent
Noguchi et al.

(10) Patent No.: US 11,946,408 B2
(45) Date of Patent: Apr. 2, 2024

(54) TWO-STROKE INTERNAL COMBUSTION ENGINE AND ENGINE WORKING MACHINE

(71) Applicant: YAMABIKO CORPORATION, Tokyo (JP)

(72) Inventors: Masanori Noguchi, Tokyo (JP); Genichi Sato, Tokyo (JP); Masami Uchida, Tokyo (JP)

(73) Assignee: YAMABIKO CORPORATION, Tokyo (JP)

(*) Notice: Subject to any disclaimer, the term of this patent is extended or adjusted under 35 U.S.C. 154(b) by 0 days.

(21) Appl. No.: 17/759,723

(22) PCT Filed: Dec. 23, 2020

(86) PCT No.: PCT/JP2020/048093
§ 371 (c)(1),
(2) Date: Jul. 29, 2022

(87) PCT Pub. No.: WO2021/176813
PCT Pub. Date: Sep. 10, 2021

(65) Prior Publication Data
US 2023/0119430 A1    Apr. 20, 2023

(30) Foreign Application Priority Data

Mar. 2, 2020   (JP) ................. 2020-034898

(51) Int. Cl.
*F02B 25/16*  (2006.01)
*F02B 75/02*  (2006.01)
(Continued)

(52) U.S. Cl.
CPC .............. *F02B 25/16* (2013.01); *F02B 75/02* (2013.01); *F02M 51/04* (2013.01); *F02M 61/14* (2013.01); *F02B 2075/025* (2013.01)

(58) Field of Classification Search
CPC .... F02B 25/16; F02B 75/02; F02B 2075/025; F02M 61/14; F02M 51/04
See application file for complete search history.

(56) References Cited

U.S. PATENT DOCUMENTS 5,653,103 A * 8/1997 Katoh ................. F01N 3/08
60/283
2007/0119404 A1* 5/2007 Yuasa ................. F02F 7/0082
123/195 R
(Continued)

FOREIGN PATENT DOCUMENTS

JP    S61164029 A    7/1986
JP    H261364 A    3/1990
(Continued)

OTHER PUBLICATIONS

International Search Report in PCT/JP2020/048093, dated Feb. 22, 2021. 7pp.

*Primary Examiner* — Kevin A Lathers
(74) *Attorney, Agent, or Firm* — HAUPTMAN HAM, LLP (57) ABSTRACT

Provided is a two-stroke internal combustion engine, including: a fuel injection valve configured to supply a fuel to a crank chamber; an intake passage configured to allow only air to be sucked thereinto under a negative pressure generated when a piston is actuated; and a scavenging passage that allows communication between the crank chamber and a combustion chamber. The intake passage is branched into a first intake passage and a second intake passage. The first intake passage communicates with the crank chamber. The second intake passage communicates with the scavenging passage. The fuel injection valve is configured to inject the fuel toward at least one of the first intake passage or the crank chamber. Further, air stagnant in the scavenging passage at end of air suction serves as leading air to contribute to scavenging.

14 Claims, 5 Drawing Sheets

(51) Int. Cl.
*F02M 51/04* (2006.01)
*F02M 61/14* (2006.01)

(56) References Cited

U.S. PATENT DOCUMENTS

| | | | |
|---|---|---|---|
| 2007/0125324 A1* | 6/2007 | Houston | F01M 3/02 |
| | | | 123/73 AD |
| 2010/0101523 A1* | 4/2010 | Naegele | F02M 37/12 |
| | | | 123/179.12 |
| 2011/0061637 A1* | 3/2011 | Mavinahally | F02B 25/22 |
| | | | 123/472 |
| 2014/0000537 A1 | 1/2014 | Rieber et al. | |
| 2017/0165863 A1 | 6/2017 | Wolf et al. | |
| 2021/0254544 A1* | 8/2021 | Koehli | F02M 61/14 |

FOREIGN PATENT DOCUMENTS

| | | |
|---|---|---|
| JP | H9125966 A | 5/1997 |
| JP | 2003307132 A | 10/2003 |
| JP | 20092009939 A | 9/2009 |
| JP | 2013119861 A | 6/2013 |
| JP | 2013170471 A | 9/2013 |
| JP | 2015169195 A | 9/2015 |
| WO | 02061245 A1 | 8/2002 |

* cited by examiner

TWO-STROKE INTERNAL COMBUSTION ENGINE AND ENGINE WORKING MACHINE

RELATED APPLICATIONS

The present application is a National Phase of international Application Number PCT/JP2020/048093, filed Dec. 23, 2020, and claims priority to Japanese Patent Application Number 2020-034898, filed Mar. 2, 2020.

TECHNICAL FIELD

This disclosure relates to a two-stroke internal combustion engine and an engine working machine using the two-stroke internal combustion engine as a power source.

BACKGROUND ART

A two-stroke internal combustion engine is often used as a power source in portable working machines such as brush cutters, chain saws, and power blowers. In the two-stroke internal combustion engine, air and a fuel are mixed in a carburetor to generate an air-fuel mixture, and the air-fuel mixture is sucked into a crank chamber. The two-stroke internal combustion engine includes a scavenging passage that allows communication between the crank chamber and a combustion chamber. When a piston is actuated in a cylinder, the air-fuel mixture having been pre-compressed in the crank chamber is introduced into the combustion chamber through the scavenging passage, and scavenging is performed with the air-fuel mixture.

The two-stroke internal combustion engine has a well-known problem of "air-fuel mixture (fresh gas) blow-by". Specifically, the air-fuel mixture for scavenging introduced into the combustion chamber is directly discharged from an exhaust port of the cylinder. The air-fuel mixture blow-by leads to a waste of fuel, and may cause air pollution.

Further, as disclosed in Japanese Patent Application Laid-open No. 2009-209939, there is given, as an example of a configuration for preventing the air-fuel mixture blow-by, a configuration including a partition wall that divides an intake passage of the carburetor into an air-fuel mixture passage and an air passage. However, such a configuration has problems such as complication of a structure due to the presence of the partition wall, an increase in cost, and intrusion of the air-fuel mixture into the air passage through a gap despite the presence of the partition wall. Further, there is also a configuration including the air-fuel mixture passage and the air passage that are independent of and separate from each other. In this case, such a configuration has problems such as complication of a structure, an increase in cost, and the need for two throttle valves.

Further, as in other engines, it is desired that an air-fuel mixture that is most suitable for an operating state of the engine be supplied to the combustion chamber in the two-stroke internal combustion engine.

Solution to Problem

This disclosure has been made in view of the circumstances described above, and has an object to provide a two-stroke internal combustion engine that prevents air-fuel mixture blow-by at a time of scavenging and allows an air-fuel mixture suitable for an operating state of the engine to be supplied to a combustion chamber.

This disclosure has another object to provide an engine working machine including the two-stroke internal combustion engine as a power source.

In order to solve the problems described above, according to this disclosure, there is provided a two-stroke internal combustion engine, including: a cylinder, which defines a combustion chamber, and has an exhaust port; an ignition device configured to ignite an air-fuel mixture in the combustion chamber; a piston configured to reciprocate inside the cylinder through combustion and expansion that occur in the combustion chamber; a crank chamber communicating with an interior of the cylinder; a crankshaft, which is disposed in the crank chamber, and is operationally coupled to the piston; a fuel injection valve configured to supply a fuel to the crank chamber; an intake passage configured to allow only air to be sucked thereinto under a negative pressure generated when the piston is actuated; and a scavenging passage that allows communication between the crank chamber and the combustion chamber, wherein the intake passage branches into a first intake passage and a second intake passage, wherein the first intake passage communicates with the crank chamber, and the second intake passage communicates with the scavenging passage, and wherein the fuel injection valve is configured to inject the fuel toward at least one of the first intake passage or the crank chamber, and air stagnant in the scavenging passage at end of air suction serves as leading air to contribute to scavenging.

According to this disclosure, the fuel is supplied to the crank chamber by the fuel injection valve. Further, a part of air passing through the intake passage is introduced into the crank chamber through the first intake passage, and another part of air is introduced into the crank chamber through the second intake passage and the scavenging passage. At the end of air suction, the air stagnates in the scavenging passage. The air that has been introduced into the crank chamber is mixed with the fuel to generate an air-fuel mixture. The air-fuel mixture in the crank chamber is introduced into the combustion chamber through the scavenging passage by actuating the piston. The air-fuel mixture in the combustion chamber is compressed by the piston, and is ignited by the ignition device to cause combustion and expansion. Discharge and scavenging are achieved while the piston is being pushed back by the combustion and expansion. Specifically, when an exhaust port is opened, a combustion gas is discharged therefrom. Subsequently, the air stagnant in the scavenging passage is pressure-fed into the combustion chamber, and serves as the leading air to contribute to the scavenging. Through the scavenging, the combustion gas is discharged from the exhaust port.

As described above, according to this disclosure, the fuel is supplied to the crank chamber by the fuel injection valve. Thus, fuel supply timing can easily be controlled, thereby enabling supply of the air-fuel mixture suitable for an operating state of the engine. Further, a part of air is introduced into the crank chamber through the second intake passage and the scavenging passage. Thus, at the end of air suction, air stagnates in the scavenging passage. The air serves as the leading air to contribute to the scavenging. Thus, air-fuel mixture blow-by, which may occur at a time of scavenging, is prevented. As a result, an exhaust gas is improved in components thereof. Further, only air is sucked into the intake passage. Thus, unlike an intake passage of a related-art carburetor, a partition wall for partitioning the intake passage into an air-fuel mixture passage and an air passage or a plurality of throttle valves are not required. Thus, the intake passage has a simple structure. The suction of only air into the intake passage not only enables easy control of intake air but also contributes to improvement of reliability of the air control.

As one embodiment, the fuel injection valve may be configured to inject the fuel in a direction that avoids the scavenging passage. In this manner, the fuel is less liable to be mixed the stagnant air in the scavenging passage.

As one embodiment, the fuel injection valve may include a high-pressure fuel injection valve configured to receive a fuel pressure from at least one of an electrically-driven fuel pump or a pump configured to operate through rotation of the crankshaft. This fuel injection valve enables the fuel injection to an aimed position.

As one embodiment, the fuel injection valve may be configured to inject the fuel at high pressure toward an area required to be cooled in the cylinder or the crank chamber. This configuration allows the area required to be cooled to be effectively cooled with the fuel injected from the fuel injection valve at high pressure.

As one embodiment, the fuel injection valve may include a high-pressure fuel injection valve capable of injecting the fuel when the crank chamber has a maximum internal pressure while the piston is being actuated. The use of this fuel injection valve enables optimization of timing of fuel injection into the crank chamber, thus components of the exhaust gas is improved thereof, such as suppressing the mixing gasoline with the leading air.

As one embodiment, an engine working machine includes the two-stroke internal combustion engine as a power source. This engine working machine has the following advantages. A working machine, in particular, a handheld or backpack type portable working machine is desired to be reduced in size and weight in terms of workability and handleability. With a related-art configuration in which a carburetor has a partition wall or an air-fuel mixture passage and an air passage are independent of and separate from each other, however, reduction in size and weight of the working machine is limited. Meanwhile, since the engine working machine according to one embodiment includes the two-stroke internal combustion engine having a simple structure as a power source, it can contribute to reduction in size and weight of the working machine.

As one embodiment, the fuel injection valve may be installed on a side where a fuel tank is arranged with respect to a plane containing an axis of the cylinder and an axis of the crankshaft. This configuration allows the fuel tank and the fuel injection valve to be positioned closer to each other. Thus, a pipe provided between the fuel tank and the fuel injection valve requires only a short length, which further contributes to reduction in size and weight of the working machine. Further, in this case, the fuel can be quickly fed to the fuel injection valve because of a short distance between the fuel tank and the fuel injection valve. Thus, an engine can be started in a desirable manner. In particular, in a case of a high-pressure fuel injection valve that is used together with an electrically-driven fuel pump provided to a fuel tank, a distance between the electrically-driven fuel pump and the injection valve is short. Thus, the fuel can be relatively easily supplied to the fuel injection valve at a time of engine start, thereby achieving improved startability.

As one embodiment, the fuel injection valve may have a fuel inlet at a rear end and be configured to inject the fuel upward, and a fuel tank may be arranged below the crank chamber. Also in this case, the same action effects as those described above are obtained.

DESCRIPTION OF EMBODIMENTS

Now, with reference to the accompanying drawings, a description is given of the embodiments of this disclosure.

A two-stroke internal combustion engine (hereinafter simply referred to as "engine") according to this disclosure is of air-cooled type to be mainly mounted in a portable engine working machine as a power source. Examples of a working machine in which the engine of this disclosure is used include a handheld, shoulder hanging, or backpack type portable working machine such as a chainsaw, a brush cutter, a power cutter, a hedge-trimmer, and a power blower.

Figure 1:
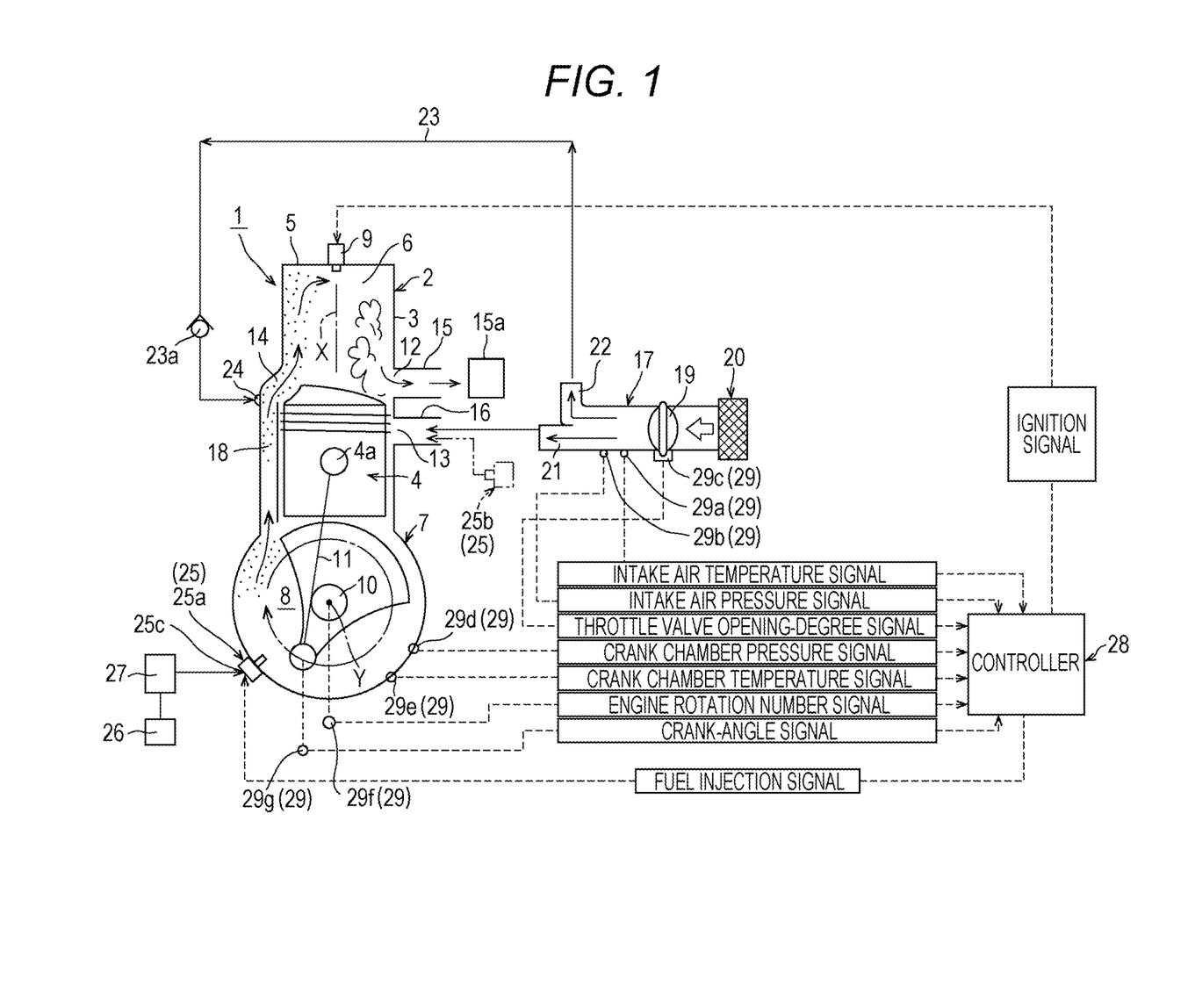
FIG. 1 is a schematic view of a two-stroke internal combustion engine according to one embodiment of this disclosure.

As illustrated in FIG. 1, an engine 1 according to one embodiment of this disclosure includes a cylinder block 2 and a piston 4. The piston 4 slidably reciprocates inside a cylinder 3 forming the cylinder block 2. A cylinder head 5, which forms one end side of the cylinder block 2, and the piston 4 define a combustion chamber 6. A crankcase 7, which forms another end side of the cylinder block 2, and the piston 4 define a crank chamber 8. A spark plug 9 forming to an ignition device is firmly fixed to the cylinder head 5. The spark plug 9 projects into the combustion chamber 6. A crankshaft 10 is pivotably supported in the crankcase 7. The crankshaft 10 and a piston pin 4a of the piston 4 are coupled to each other with a connecting rod 11. Combustion and expansion (explosion) in the combustion chamber 6 cause the piston 4 to slidably reciprocate inside the cylinder 3. The reciprocation of the piston 4 rotationally drives the crankshaft 10 through the connecting rod 11, and a rotational driving force is output to an output shaft (not shown) connected to the crankshaft 10.

An exhaust port 12, an intake port 13, and at least one scavenging port 14 are open on an inner wall of the cylinder 3. These ports 12, 13, and 14 are controlled to be opened and closed at predetermined timing through the reciprocation of the piston 4. The exhaust port 12 communicates with a muffler 15a via an exhaust pipe 15. The intake port 13 communicates with an intake passage 17 via an intake pipe 16. The scavenging port 14 communicates with the crank chamber 8 via a scavenging passage 18.

Although not shown, the intake port 13 may be formed in the crankcase 7 in place of the cylinder 3. In this case, a check valve is disposed to prevent backflow of an air-fuel mixture in the crank chamber 8 toward the intake pipe 16 when the piston 4 moves down.

Only air is sucked into the intake passage 17 by the negative pressure generated when the piston 4 is actuated. A throttle valve 19 such as a butterfly throttle valve is disposed in the intake passage 17, and an air cleaner 20 is disposed on an upstream side of the throttle valve 19. When an output operating member (such as a throttle trigger or a throttle lever) of a working machine is operated by an operator, an opening degree of the throttle valve 19 is adjusted.

The intake passage 17 branches into a first intake passage 21 and a second intake passage 22 on a downstream side of the throttle valve 19. The first intake passage 21 communicates with the crank chamber 8 via the intake pipe 16. The second intake passage 22 communicates with the scavenging passage 18 via an air passage 23. A check valve 23*a* that prevents backflow of air from the scavenging passage 18 is disposed in the air passage 23. The air passage 23 is coupled to an air intake port 24 formed at an end of the scavenging passage 18, which is located on a side closer to the scavenging port 14. The air passage 23 guides the air that has been purified by the air cleaner 20 to the scavenging passage 18.

The air that has been purified by the air cleaner 20 branches from the intake passage 17 into the first intake passage 21 and the second intake passage 22, and is then sucked into the crank chamber 8 during an intake stroke in which a pressure in the crank chamber 8 becomes negative. A part of the air passing through the intake passage 17 is sucked into the crank chamber 8 through the first intake passage 21 and the intake pipe 16, and the other part of the air is sucked into the crank chamber 8 through the second intake passage 22, the air passage 23, and the scavenging passage 18. At the end of the intake stroke, the air stagnates in the scavenging passage 18. During a scavenging stroke, the stagnant air flows from the scavenging port 14 into the cylinder 3 as leading air before the air-fuel mixture in the crank chamber 8 flows thereinto. As a result, a combustion gas in the combustion chamber 6 is discharged from the exhaust port 12.

The engine 1 includes a fuel injection valve 25 for supplying a fuel into the crank chamber 8. The fuel is mixed with the air in the crank chamber 8 to generate an air-fuel mixture. The fuel injection valve 25 injects the fuel toward at least one of the crank chamber 8 or the first intake passage 21. In the illustrated example, a first fuel injection valve 25*a* is provided to a lower part of the crankcase 7. A fuel is injected from the first fuel injection valve 25*a* into the crank chamber 8. In place of the first fuel injection valve 25*a*, a second fuel injection valve 25*b* that injects a fuel toward the first intake passage 21 may be provided. In the illustrated example, the second fuel injection valve 25*b* is disposed so as to face the intake pipe 16 communicating with the first intake passage 21, as indicated by an imaginary line. Both of the first fuel injection valve 25*a* and the second fuel injection valve 25*b* may be provided together.

A fuel tank 26 and a fuel pump 27 are coupled to the fuel injection valve 25. When the fuel pump 27 is actuated, the fuel in the fuel tank 26 is supplied to the fuel injection valve 25, and the injection of the fuel is controlled by opening and closing the fuel injection valve 25.

The fuel injection valve 25 is controlled to be opened and closed by a controller 28 including a microcomputer. A detection signal from at least one sensor 29 (29*a* to 29*g*) that detects an operating condition of the engine 1 is input to the controller 28. The controller 28 controls the fuel supply from the fuel injection valve 25 to the crank chamber 8 based on the detection performed by the sensor 29.

Examples of the at least one sensor 29 include, for example, an intake air temperature sensor 29*a*, an intake air pressure sensor 29*b*, a throttle valve opening-degree sensor 29*c*, a crank chamber pressure sensor 29*d*, a crank chamber temperature sensor 29*e*, an engine rotation number sensor 29*f*, and a crank angle sensor 29*g*. The intake air temperature sensor 29*a* detects an intake air temperature, and sends out a signal. The intake air pressure sensor 29*b* detects an intake air pressure, and sends out a signal. The throttle valve opening-degree sensor 29*c* detects an opening degree of the throttle valve 19, and sends out a signal. The crank chamber pressure sensor 29*d* detects a pressure in the crank chamber 8, and sends out a signal. The crank chamber temperature sensor 29*e* detects a temperature in the crank chamber 8, and sends out a signal. The engine rotation number sensor 29*f* detects a rotation number of the engine 1, and sends out a signal. The crank angle sensor 29*g* detects a crank angle, and sends out a signal. The signals from these sensors 29*a* to 29*g* are input to the controller 28.

The controller 28 sends out a fuel injection signal to the fuel injection valve 25 at appropriate timing and sends out an ignition signal to the spark plug 9 forming the ignition device at predetermined timing in accordance with a predetermined program based on various signals from the sensors 29*a* to 29*g*. In this manner, the fuel supply to the crank chamber 8 and ignition of the air-fuel mixture in the combustion chamber 6 are achieved.

Next, an operation of the engine 1 of FIG. 1 is described with reference to FIGS. 2A to 2D. In FIGS. 2A to 2D, FIG. 2A is an explanatory view for illustrating an operation at a time of scavenging, FIG. 2B is an explanatory view for illustrating an operation at a time of intake and compression, FIG. 2C is an explanatory view for illustrating an operation at a time of combustion and expansion (explosion), and FIG. 2D is an explanatory view for illustrating an operation at a time of discharge. The fuel injection to the crank chamber 8 is only required to be performed at an appropriate time, as an example, the fuel injection is set to occur in a final phase of the intake stroke.

Figure 2A:
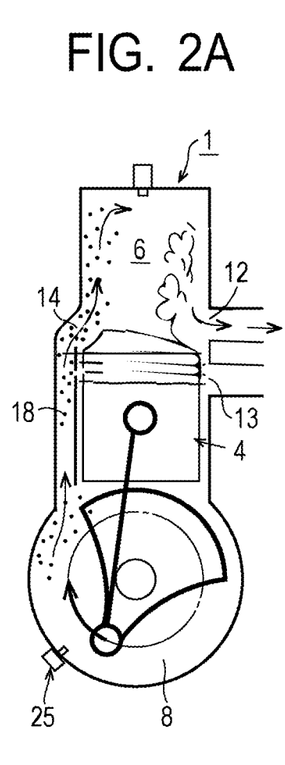
FIGS. 2A to 2D are explanatory views for illustrating working strokes of the engine of FIG. 1.
Figure 2B:
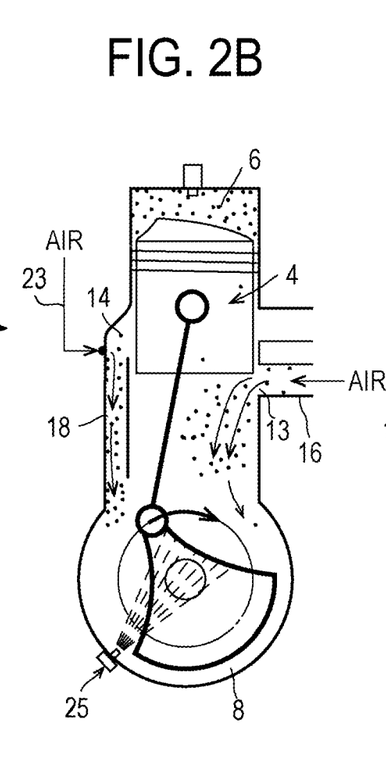
Figure 2C:
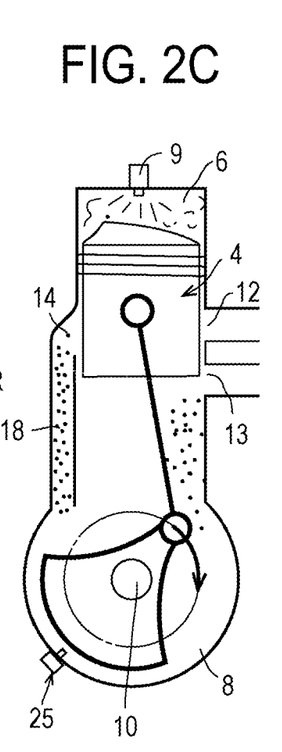
Figure 2D:
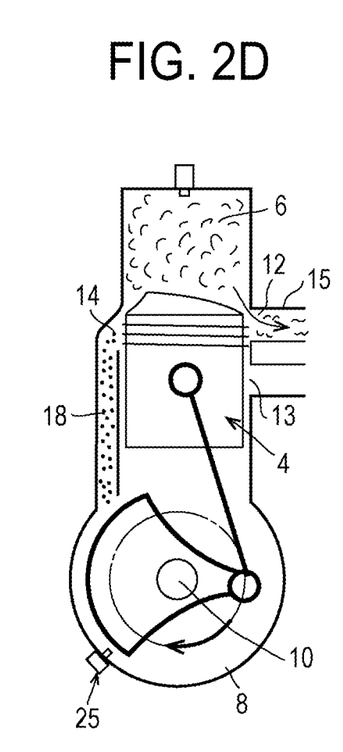

As illustrated in FIGS. 2A and 2B, when the scavenging port 14 is closed by the piston 4 in a process in which the piston 4 is moving up from a bottom dead center, the pressure in the crank chamber 8 becomes negative due to the upward movement of the piston 4. As a result, air is sucked through the air passage 23 into the scavenging passage 18. Subsequently, simultaneously with opening of the intake port 13, the air is sucked through the intake pipe 16 into the crank chamber 8. As an example, the fuel is injected from the fuel injection valve 25 in the final phase of the intake stroke. The air-fuel mixture is compressed in the combustion chamber 6 until the piston 4 reaches a top dead center. When the piston 4 reaches the top dead center, the suction of air into the crank chamber 8 ends. At this time, the crank chamber 8 is filled with the air-fuel mixture corresponding to a mixture of a fuel and air, and air is stagnant in the scavenging passage 18.

As illustrated in FIG. 2C, when the piston 4 reaches the top dead center, ignition is performed by the spark plug 9. The ignition causes combustion and expansion (explosion) of the air-fuel mixture in the combustion chamber 6 to push down the piston 4 to the bottom dead center. As a result, the crankshaft 10 is rotated to generate power. When the intake port 13 is closed with the piston 4 that is moving down, the air-fuel mixture in the crank chamber 8 is pre-compressed.

As illustrated in FIG. 2D, when the exhaust port 12 is opened as a result of downward movement of the piston 4, a combustion gas flows out to the exhaust pipe 15. Subsequently, as illustrated in FIG. 2A, the scavenging port 14 is opened to allow the pre-compressed air-fuel mixture in the crank chamber 8 to be sent into the combustion chamber 6 through the scavenging passage 18. At this time, the stagnant air in the scavenging passage 18 flows into the combustion chamber 6 as leading air before the air-fuel mixture in the crank chamber 8 flows thereinto, and pushes the combustion gas to the exhaust port 12. Thus, blow-by of the air-fuel mixture at the time of scavenging is reduced. The piston 4 moves toward the top dead center again through the rotation of the crankshaft 10. After that, the same actions are repeated.

Figure 3:
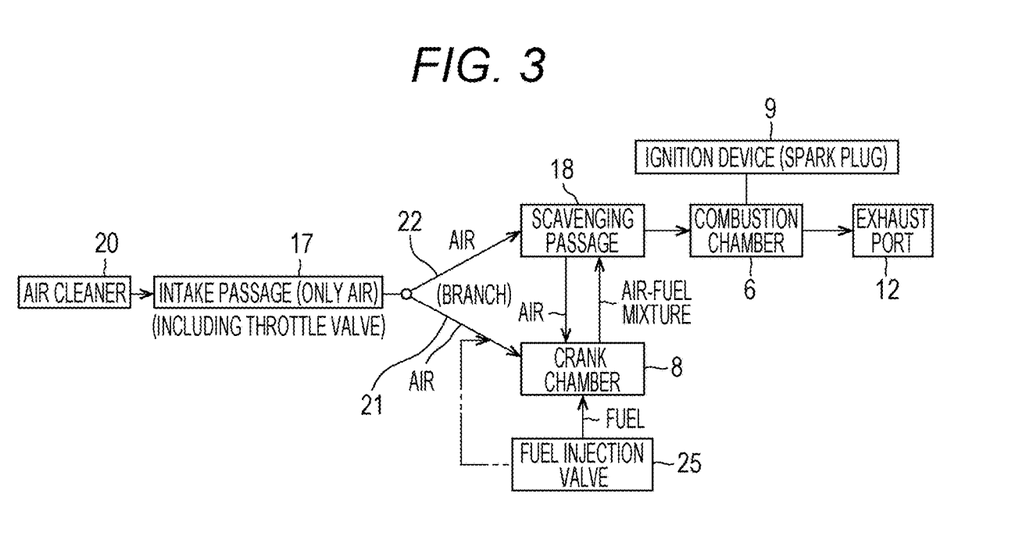
FIG. 3 is a block diagram for illustrating flows of air and a fuel in the engine of FIG. 1.

Flows of the air and the fuel in the engine 1 of FIG. 1 can be simplified as illustrated in a block diagram of FIG. 3.

In the engine 1 according to this embodiment, since the fuel is supplied to the crank chamber 8 by the fuel injection valve 25, timing of the fuel supply can easily be controlled, thereby enabling the supply of the air-fuel mixture suitable for the operating condition of the engine 1. Further, air stagnates in the scavenging passage 18 at the end of the air suction, and the stagnant air serves as leading air to contribute to scavenging. Thus, air-fuel mixture air blow-by, which may occur at the time of scavenging, is prevented, and components of an exhaust gas is improved thereof. Further, only air is sucked into the intake passage 17, unlike an intake passage of a related-art carburetor, a partition wall for partitioning the intake passage into an air-fuel mixture passage and an air passage or a plurality of throttle valves are not required. Thus, the intake passage 17 has a simple structure. The intake passage 17 that allows only air to be sucked thereinto not only facilitates control of the intake air but also contributes to improvement of reliability of the air control. Further, the second intake passage 22 communicates with the scavenging passage 18 via the check valve 23a, which contributes to simplification of the piston 4 and the scavenging passage 18.

The layout and type of the fuel injection valve 25 may be determined, for example, as follows.

As a suitable one embodiment, the fuel injection valve 25 may be configured to inject the fuel in a direction that avoids the scavenging passage 18. In this manner, the fuel is less liable to be mixed with the stagnant air in the scavenging passage 18.

As a suitable one embodiment, the fuel injection valve 25 may include a high-pressure fuel injection valve configured to receive a fuel pressure from at least one of an electrically-driven fuel pump or a pump configured to operate through rotation of the crankshaft. The use of the high-pressure fuel injection valve enables the fuel injection to an aimed position. For example, the fuel injection can be aimed at a position in the engine 1 where seizure is liable to occur.

As a suitable one embodiment, the fuel injection valve 25 may be configured to inject the fuel at high pressure toward an area required to be cooled in the cylinder 3 or the crank chamber 8. This configuration allows the area required to be cooled to be effectively cooled with the fuel injected from the fuel injection valve 25 at high pressure. An example of the area required to be cooled includes an area where frictional heat is generated, such as a coupling portion between the connecting rod 11 and the piston pin 4a or a coupling portion between the connecting rod 11 and the crankshaft 10. Further, the fuel may be injected at high pressure against an inner wall of the piston 4 so as to cool the piston 4.

A mixed fuel containing gasoline and lubricating oil mixed therewith is used as a fuel for a two-stroke internal combustion engine. Thus, when the fuel (mixed fuel) is supplied to the crank chamber 8, lubrication between the piston 4 and the cylinder 3 is readily and quickly achieved with the lubricating oil contained in the fuel. The lubrication also prevents the seizure of the engine 1. In this case, the seizure of the engine 1 may be prevented by the fuel injection based on at least one of a temperature signal, a rotation number signal, an intake air pressure signal, or an opening-degree signal. For example, a fuel is only required to be injected when a high temperature is detected during a high-speed operation. Also when a sudden stop is made during a high-speed operation, a fuel may be injected to prevent the seizure.

As a suitable one embodiment, the fuel injection valve 25 may include a high-pressure fuel injection valve capable of injecting the fuel when the crank chamber 8 has a maximum internal pressure while the piston 4 is being actuated. The use of the high-pressure fuel injection valve enables optimization of timing of fuel injection into the crank chamber. Thus, for example, gasoline is prevented from being mixed with the leading air, and hence the exhaust gas is improved in components thereof.

As a suitable one embodiment, as illustrated in FIG. 1, the fuel injection valve 25a may be installed on a side where a fuel tank 26 is arranged with respect to a plane containing an axis X of the cylinder 3 and an axis Y of the crankshaft 10. This configuration allows the fuel tank 26 and the fuel injection valve 25 to be positioned closer to each other. Thus, a pipe provided between the fuel tank 26 and the fuel injection valve 25 requires only a short length, which further contributes to reduction in size and weight of the working machine. Further, when the fuel injection valve 25a is disposed so that a fuel inlet 25c of the fuel injection valve 25a faces the fuel tank 26, a pipe extending from the fuel tank 26 to the fuel injection valve 25a can easily be provided. Further, in this case, a fuel can be rapidly fed to the fuel injection valve because of a short distance between the fuel tank and the fuel injection valve. Thus, the engine 1 can be started in a desirable manner. In particular, in a case of a high-pressure fuel injection valve that is used together with an electrically-driven fuel pump installed in a fuel tank, a distance between the electrically-driven fuel pump and a fuel injection valve is short. Thus, the fuel can be quickly fed to thereby start the engine 1 in a desirable manner.

As a suitable one embodiment, the fuel injection valve 25a may have a fuel inlet at a rear end and be configured to inject the fuel upward, and a fuel tank 26 may be arranged below the crank chamber 8. Also in this case, the same actions and effects as those described above are obtained.

As the fuel injection valve 25, not only an electrically controllable one but also a mechanically controllable one may be employed. When the latter one is used, for example, a mechanically openable and closable fuel injection valve may be operationally coupled to the crankshaft 10 so that the fuel injection valve is opened and closed at predetermined timing during working strokes of the piston 4.

Next, a modification example of FIG. 1 is described with reference to FIG. 4 and FIGS. 5A to 5C. In the following description, components which are the same as or equivalent to those in the example of FIG. 1 are denoted by the same reference symbols as those in FIG. 1, and overlapping description thereof is omitted.

Figure 4:
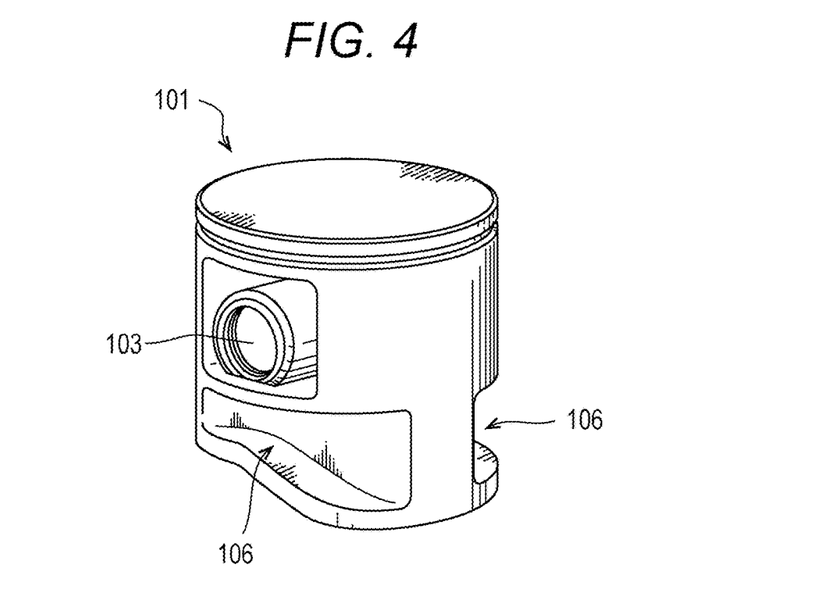
FIG. 4 is a perspective view for illustrating a modification example of a piston included in the engine of FIG. 1.

A piston 101 of FIG. 4 has a peripheral surface with piston grooves 106. An air passage 102 (see FIGS. 5A to 5C) and a scavenging passage 104 (see FIGS. 5A to 5C) are brought into communication with each other through the piston grooves 106 at predetermined timing. In FIG. 4, the piston 101 has a piston pin hole 103. The piston 101 is coupled to the connecting rod 11 (see FIG. 1) with a piston pin (see reference symbol 4a of FIG. 1) inserted into the piston pin hole 103.

Figure 5A:
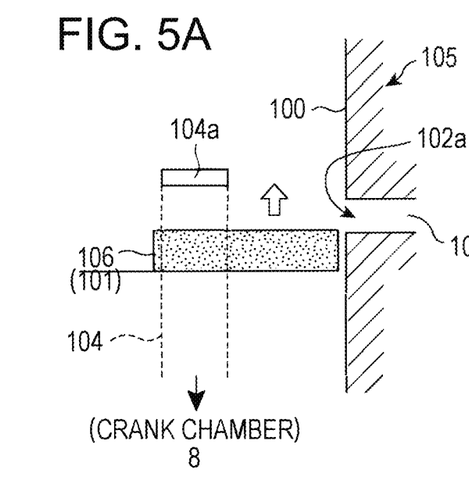
FIGS. 5A to 5C are explanatory views for illustrating inflow of air from an intake passage into a scavenging passage while the piston of FIG. 4 is moving upward.
Figure 5B:
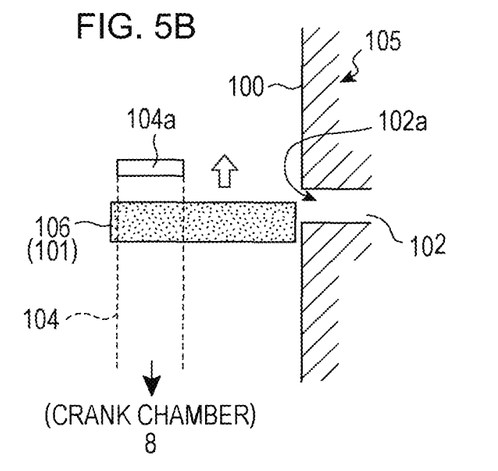
Figure 5C:
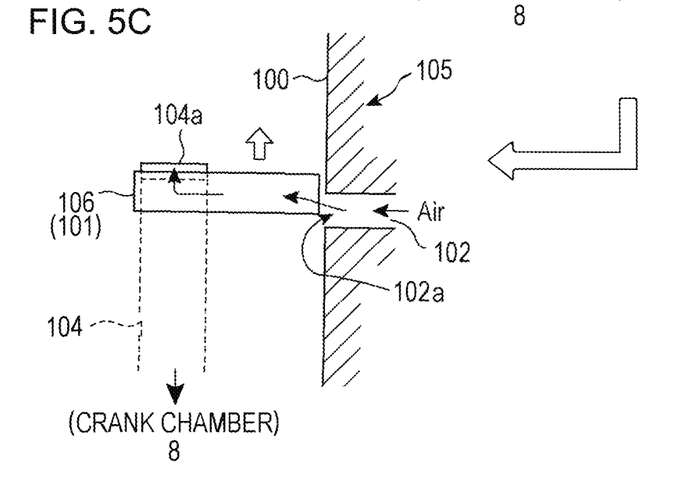

In FIGS. 5A to 5C, a cylinder 105, which is used together with the piston 101 of FIG. 4 is shown. A cylinder wall 100 of the cylinder 105 has an air port 102a in addition to an intake port and an exhaust port (both not shown) and at least one scavenging port 104a. The air port 102a communicates with the air passage 102. The air passage 102 has the same configuration as that of the air passage 23 of FIG. 1. Further, the scavenging port 104a communicates with the crank chamber 8 (see FIG. 1) via the scavenging passage 104. The air port 102a and the scavenging port 104a are both opened and closed by the piston 101.

FIGS. 5A to 5C are views for illustrating, in time series, a relationship among the piston grooves 106, the air port 102a, and the scavenging port 104a in a process in which the piston 101 is moving upward. FIG. 5B is a view for illustrating a state in which the piston 101 has moved to a higher level than that in FIG. 5A, and FIG. 5C is a view for illustrating a state in which the piston 101 has moved to a higher level than that in FIG. 5B. In FIGS. 5A to 5C, an illustration of an outline of the piston 101 is omitted to avoid complication of drawing lines, and only the piston grooves 106 extending in a circumferential direction of the piston 101 are illustrated in a simplified manner.

As illustrated in FIG. 5A, a blow-back gas generated at the time of previous scavenging remains in the piston grooves 106 during a period from start of upward movement of the piston 101 from the bottom dead center to a time immediately before the piston grooves 106 reaches the air port 102a. The blow-back gas contains an air-fuel mixture component. The blow-back gas remaining in the piston grooves 106 is indicated by dots.

FIG. 5B, which corresponds to a state in which the piston 101 has moved to a higher level, is a view for illustrating a state in which the piston grooves 106 are brought into communication with the air port 102a. Under a state illustrated in FIG. 5B, the piston grooves 106 are not in communication with the scavenging port 104a. Thus, even though the piston grooves 106 are in communication with the air port 102a, flow of air from the air port 102a toward the piston grooves 106 does not occur at this time.

Under a state illustrated in FIG. 5C in which the piston 101 has further moved to a higher level, the piston grooves 106 are in communication with both of the air port 102a and the scavenging port 104a. Under the state illustrated in FIG. 5C, air is supplied to the scavenging passage 104 via the piston grooves 106.

In an engine including a combination of the piston 101 and the cylinder 105 of FIG. 4 and FIGS. 5A to 5C, air sucked through the air passage 102 reaches the scavenging passage 104 via the piston grooves 106. Specifically, air comes into direct contact with the peripheral surface of the piston 101 to thereby improve cooling performance for the piston 101.

Figure 6:
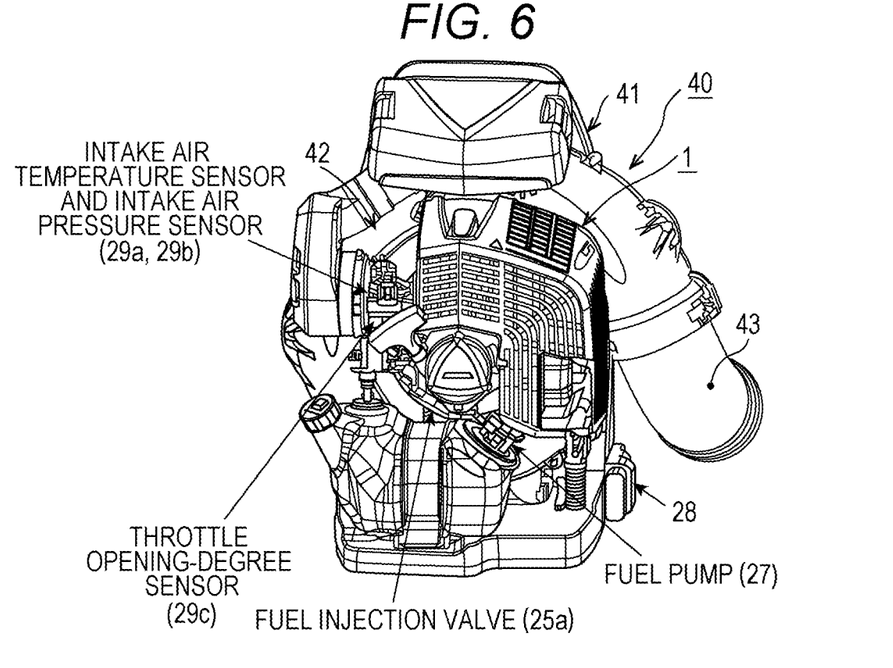
FIG. 6 is a rear view of an example of an engine working machine (power blower) including the engine of FIG. 1 mounted as a power source.
Figure 7:
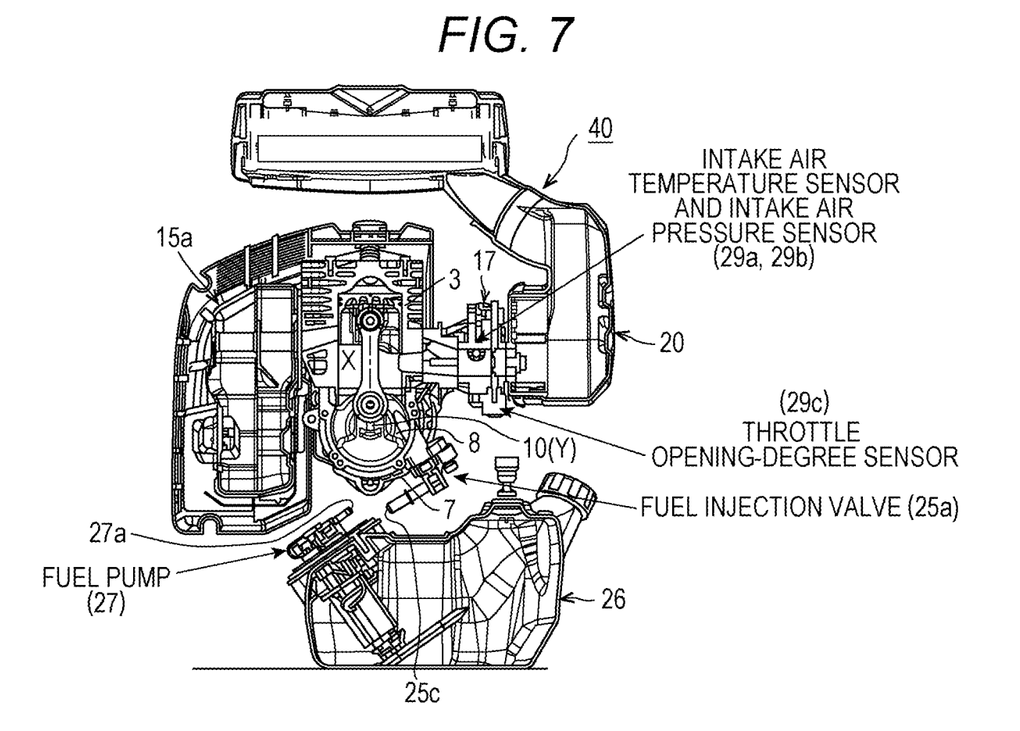
FIG. 7 is an exploded view for illustrating a positional relationship between an engine and a fuel tank of the power blower of FIG. 6 when viewed from a front side.

Next, with reference to FIG. 6 and FIG. 7, an engine working machine including the engine 1 according to the embodiment of this disclosure as a power source is described. In this embodiment, a power blower 40 is exemplified as the engine working machine. As is well known, the power blower is suitably used to, for example, blow away fallen leaves or pruned branches and leaves.

The power blower 40 of FIG. 6 includes a backpack type main body frame 41 having an L-like shape in side view. For example, an air-sending device 42, the engine 1 that drives the air-sending device 42, and the fuel tank 26 are provided on the main body frame 41. A blower pipe is connected to an L-shaped air discharge pipe 43 of the air-sending device 42 through a bellows hose (not shown) therebetween. An engine output operating member (not shown) such as a throttle lever or a throttle trigger is disposed at an appropriate position on the blower pipe.

The air-sending device 42 is disposed directly behind the main body frame 41 when viewed from an operator carrying the main body frame 41 on his/her back. The engine 1 is disposed directly behind the air-sending device 42. The cylinder 3 is disposed to extend vertically, and the crank chamber 8 is positioned below the cylinder 3. The crankshaft 10 extends in a front-and-back direction. The fuel tank 26 is disposed below the crank chamber 8. In this case, the power blower 40 having a compact size can be formed. The fuel pump 27 is disposed at one of right and left ends (right end when viewed from the operator carrying the main body frame 41 on his/her back in the example of FIG. 6) so as to be integrated therewith.

In the example of FIG. 6 and FIG. 7, the fuel injection valve 25a is mounted to the crankcase 7, and injects a fuel obliquely upward into the crank chamber 8. The fuel inlet 25c of the fuel injection valve 25a and a fuel outlet 27a of the fuel pump 27 are positioned in proximity to each other. As a result, only a short length is required for a pipe to be provided therebetween, which contributes to reduction in size and weight of the power blower 40. Further, when the fuel injection valve 25a is disposed so that the fuel inlet 25c of the fuel injection valve 25a faces the fuel pump 27, it becomes easier to provide the pipe extending from the fuel pump 27 to the fuel injection valve 25a.

The embodiments of this disclosure have been described in detail with reference to the drawings. However, a specific configuration is not limited to those of the embodiments described above. For example, changes in design without departing from the scope of this disclosure are encompassed in this disclosure. Further, technologies in the above-mentioned embodiments described above may be used in combination as long as there is no particular contradiction or problem in, for example, purpose and configuration.

The invention claimed is:

1. A two-stroke internal combustion engine, comprising:
   a cylinder, which defines a combustion chamber, and has an exhaust port;
   an ignition device configured to ignite an air-fuel mixture in the combustion chamber;
   a piston configured to reciprocate inside the cylinder through combustion and expansion that occur in the combustion chamber;
   a crank chamber communicating with an interior of the cylinder;
   a crankshaft, which is disposed in the crank chamber, and is operationally coupled to the piston;
   a fuel injection valve configured to supply a fuel to the crank chamber;
   an intake passage configured to allow only air to be sucked thereinto under a negative pressure generated in response to the piston being actuated;
   an air cleaner connected to the intake passage, and configured to purify the air into the intake passage; and
   a scavenging passage that allows communication between the crank chamber and the combustion chamber,
   wherein the intake passage branches into a first intake passage and a second intake passage,
   wherein the first intake passage directly connects with the crank chamber, and the second intake passage directly connects with the scavenging passage, the air that has been purified by the air cleaner branches from the intake passage into both of the first intake passage and the second intake passage, and the air that has been branched into the first intake passage and the second intake passage is then sucked into the crank chamber, and wherein the fuel injection valve is controlled to be opened and closed by a controller and configured to inject the fuel toward the crank chamber, and air stagnant in the scavenging passage from the second intake passage at end of air suction serves as leading air to contribute to scavenging.

2. The two-stroke internal combustion engine according to claim 1,
wherein
when the piston is at a bottom dead center,
the first intake passage is configured to be closed by the piston, and
the scavenging passage is configured to communicate with the combustion chamber to allow the air stagnant in the scavenging passage to flow into the combustion chamber.

3. The two-stroke internal combustion engine according to claim 1, wherein the fuel injection valve is configured to inject the fuel in a direction that avoids the scavenging passage.

4. The two-stroke internal combustion engine according to claim 1, wherein the fuel injection valve comprises a high-pressure fuel injection valve configured to receive a fuel pressure from at least one of an electrically-driven fuel pump or a pump configured to operate through rotation of the crankshaft.

5. The two-stroke internal combustion engine according to claim 4, wherein the fuel injection valve is configured to inject the fuel at high pressure toward an area required to be cooled in the cylinder or the crank chamber.

6. The two-stroke internal combustion engine according to claim 4, wherein the high-pressure fuel injection valve is configured to inject the fuel in response to the crank chamber having a maximum internal pressure while the piston is being actuated.

7. An engine working machine, comprising:
a two-stroke internal combustion engine as a power source, the two-stroke internal combustion engine, comprising:
a cylinder, which defines a combustion chamber, and has an exhaust port;
an ignition device configured to ignite an air-fuel mixture in the combustion chamber;
a piston configured to reciprocate inside the cylinder through combustion and expansion that occur in the combustion chamber;
a crank chamber communicating with an interior of the cylinder;
a crankshaft, which is disposed in the crank chamber, and is operationally coupled to the piston;
a fuel injection valve configured to supply a fuel to the crank chamber;
an intake passage configured to allow only air to be sucked thereinto under a negative pressure generated in response to the piston being actuated;
an air cleaner connected to the intake passage, and configured to purify the air into the intake passage; and
a scavenging passage that allows communication between the crank chamber and the combustion chamber, wherein the intake passage branches into a first intake passage and a second intake passage,
wherein the first intake passage directly connects with the crank chamber, and the second intake passage directly connects with the scavenging passage,
the air that has been purified by the air cleaner branches from the intake passage into both of the first intake passage and the second intake passage, and the air that has been branched into the first intake passage and the second intake passage is then sucked into the crank chamber, and
wherein the fuel injection valve is controlled to be opened and closed by a controller and configured to inject the fuel toward the crank chamber, and air stagnant in the scavenging passage from the second intake passage at end of air suction serves as leading air to contribute to scavenging.

8. The engine working machine according to claim 7, further comprising:
a fuel tank, wherein
the fuel injection valve is installed on a side where the fuel tank is arranged with respect to a plane containing an axis of the cylinder and an axis of the crankshaft.

9. The engine working machine according to claim 7, further comprising:
a fuel tank, wherein
the fuel injection valve has a fuel inlet at a rear end of the fuel injection valve and is configured to inject the fuel into the crank chamber.

10. The two-stroke internal combustion engine according to claim 1, further comprising:
a check valve between the second intake passage and the scavenging passage, wherein the check valve is configured to prevent backflow of the air from the scavenging passage to the second intake passage.

11. The engine working machine according to claim 7, wherein
the two-stroke internal combustion engine further comprises a check valve between the second intake passage and the scavenging passage, wherein the check valve is configured to prevent backflow of the air from the scavenging passage to the second intake passage.

12. The engine working machine according to claim 7, wherein
when the piston is at a bottom dead center,
the first intake passage is configured to be closed by the piston, and
the scavenging passage is configured to communicate with the combustion chamber to allow the air stagnant in the scavenging passage to flow into the combustion chamber.

13. A two-stroke internal combustion engine, comprising:
a cylinder, which defines a combustion chamber, and has an exhaust port;
an ignition device configured to ignite an air-fuel mixture in the combustion chamber;
a piston configured to reciprocate inside the cylinder through combustion and expansion that occur in the combustion chamber, the piston including a piston groove on a peripheral surface of the piston;
a crank chamber communicating with an interior of the cylinder;
a crankshaft, which is disposed in the crank chamber, and is operationally coupled to the piston;
a fuel injection valve configured to supply a fuel to the crank chamber;

an intake passage configured to allow only air to be sucked thereinto under a negative pressure generated in response to the piston being actuated;

an air cleaner connected to the intake passage, and configured to purify the air into the intake passage; and a scavenging passage that allows communication between the crank chamber and the combustion chamber, wherein the intake passage branches into a first intake passage and a second intake passage, wherein the first intake passage directly connects with the crank chamber, and the second intake passage connects with the scavenging passage through the piston groove, the air that has been purified by the air cleaner branches from the intake passage into both of the first intake passage and the second intake passage, and the air that has been branched into the first intake passage and the second intake passage is then sucked into the crank chamber, and wherein the fuel injection valve is controlled to be opened and closed by a controller and configured to inject the fuel toward the crank chamber, and air stagnant in the scavenging passage from the second intake passage at end of air suction serves as leading air to contribute to scavenging.

14. The two-stroke internal combustion engine according to claim 13, wherein the piston is configured to communicate the second intake passage and the scavenging passage through the piston groove at predetermined timing.

* * * * *